(12) United States Patent
Shimahara et al.

(10) Patent No.: US 11,280,363 B2
(45) Date of Patent: Mar. 22, 2022

(54) TORQUE LIMITING DEVICE HAVING HOLDING CLAWS

(71) Applicant: Hilti Aktiengesellschaft, Schaan (LI)

(72) Inventors: Hideki Shimahara, Grabs (CH); Erich Infanger, Schiers (CH)

(73) Assignee: Hilti Aktiengesellschaft, Schaan (LI)

( * ) Notice: Subject to any disclaimer, the term of this patent is extended or adjusted under 35 U.S.C. 154(b) by 232 days.

(21) Appl. No.: 16/475,486

(22) PCT Filed: Dec. 5, 2017

(86) PCT No.: PCT/EP2017/081493
§ 371 (c)(1),
(2) Date: Jul. 2, 2019

(87) PCT Pub. No.: WO2018/127338
PCT Pub. Date: Dec. 7, 2018

(65) Prior Publication Data
US 2019/0338800 A1  Nov. 7, 2019

(30) Foreign Application Priority Data
Jan. 5, 2017 (EP) .................................. 17150335

(51) Int. Cl.
*F16B 31/02* (2006.01)
*F16B 13/06* (2006.01)
*F16B 37/14* (2006.01)

(52) U.S. Cl.
CPC .......... *F16B 31/021* (2013.01); *F16B 13/065* (2013.01); *F16B 37/14* (2013.01); *F16B 31/02* (2013.01)

(58) Field of Classification Search
CPC ........ F16B 13/065; F16B 31/00; F16B 31/02; F16B 31/021; F16B 31/025; F16B 31/028; F16B 31/04; F16B 37/14; Y10S 411/917
(Continued)

(56) References Cited

U.S. PATENT DOCUMENTS 1,380,395 A * 6/1921 Korach ................. F16B 39/286
411/3
2,394,812 A * 2/1946 Seitz ..................... F16B 39/286
411/5
(Continued)

FOREIGN PATENT DOCUMENTS

AU       2009200994      11/2009
CN       202914489 U     5/2013
(Continued)

OTHER PUBLICATIONS

International Search Report of PCT/EP2017/081493, dated Mar. 3, 2018.

*Primary Examiner* — Roberta S Delisle
(74) *Attorney, Agent, or Firm* — Davidson, Davidson & Kappel, LLC

(57) ABSTRACT

A device for torque limiting, which includes a nut and a holding element including a top part having an entrainment profile in a rear area for the rotatably fixed coupling of the top part with a setting tool. A receiving part has a receptacle in a front area of the holding element, in which the nut is rotatably fixedly accommodated. A device for torque transmission from the top part to the receiving part connects the top part and the receiving part and breaks at a limiting torque, interrupting the connection between the top part and the receiving part. The holding element includes at least one holding claw situated on the receiving part and securing the nut in the receptacle on the front side of the nut. A fastening (Continued)

arrangement made up of an expansion anchor and a device of this type for torque limiting as well as a method for manufacturing a device of this type.

12 Claims, 4 Drawing Sheets

(58) Field of Classification Search
USPC .................................. 411/1, 2, 3, 5–6, 432
See application file for complete search history.

(56) References Cited

U.S. PATENT DOCUMENTS

| | | | |
|---|---|---|---|
| 3,370,341 A * | 2/1968 | Allsop | B65D 21/0219 |
| | | | 29/413 |
| 3,444,775 A * | 5/1969 | Hills | F16B 31/021 |
| | | | 411/5 |
| 3,482,864 A * | 12/1969 | Bynum | F16B 31/021 |
| | | | 411/5 |
| 3,728,933 A | 4/1973 | Grube et al. | |
| 3,742,583 A * | 7/1973 | Devlin | F16B 31/021 |
| | | | 29/413 |
| 3,978,761 A * | 9/1976 | Sosinski | F16B 31/021 |
| | | | 411/5 |
| 4,046,052 A | 9/1977 | Nordstrom | |
| 4,215,600 A | 8/1980 | Kesselmann et al. | |
| 4,729,703 A * | 3/1988 | Sato | F16B 31/021 |
| | | | 411/237 |
| 5,865,581 A * | 2/1999 | Sadri | F16B 31/021 |
| | | | 411/5 |
| 6,176,659 B1 * | 1/2001 | Hardt | F16B 31/021 |
| | | | 411/393 |
| 6,406,240 B1 * | 6/2002 | Potter | F16B 37/0864 |
| | | | 411/267 |
| 9,194,417 B2 | 11/2015 | Marchand et al. | |
| 9,316,248 B2 | 4/2016 | Appl et al. | |
| 9,970,467 B2 | 5/2018 | Dijkhuis et al. | |
| 10,584,731 B2 | 3/2020 | Gstach et al. | |
| 2002/0076295 A1 | 6/2002 | Gibbons | |
| 2003/0198528 A1 | 10/2003 | Onishi et al. | |
| 2004/0226419 A1 | 11/2004 | Morgan | |
| 2012/0328388 A1 * | 12/2012 | Hardt | H01R 4/307 |
| | | | 411/5 |
| 2013/0303293 A1 | 11/2013 | Eckstein et al. | |
| 2015/0226248 A1 * | 8/2015 | Robertson, Jr. | F16B 31/021 |
| | | | 405/288 |
| 2016/0053792 A1 | 2/2016 | Rosenkranz et al. | |
| 2016/0305464 A1 * | 10/2016 | Balderrama | F16B 31/021 |
| 2017/0343026 A1 | 11/2017 | Schaeffer | |
| 2019/0331154 A1 | 10/2019 | Shimahara | |
| 2019/0338796 A1 | 11/2019 | Shimahara | |

FOREIGN PATENT DOCUMENTS

| | | |
|---|---|---|
| CN | 103180623 B | 6/2013 |
| CN | 203230709 U | 9/2013 |
| CN | 105190058 A | 12/2015 |
| CN | 105556138 A | 5/2016 |
| CN | 105705804 A | 6/2016 |
| CN | 105829735 A | 8/2016 |
| DE | 102010042260 | 4/2012 |
| DE | 102010043167 | 5/2012 |
| DE | 102011106696 A1 | 1/2013 |
| EP | 1353080 B1 | 10/2003 |
| EP | 2952755 B1 | 8/2020 |
| ER | 2598855 A1 | 1/1987 |
| GB | 1330320 | 11/1987 |
| JP | S4520582 Y1 | 8/1970 |
| JP | H0685918 U | 12/1994 |
| JP | 2000257623 A | 9/2000 |
| JP | 2001140832 A | 5/2001 |
| RU | 2012105535 A | 8/2013 |
| WO | WO2011007052 A1 | 1/2011 |
| WO | WO2017050725 | 3/2017 |
| WO | WO2018127336 | 7/2018 |
| WO | WO2018127337 | 7/2018 |

* cited by examiner

TORQUE LIMITING DEVICE HAVING HOLDING CLAWS

The present invention relates to a device for torque. A device of this type includes a nut, in particular having at least one female thread, and a holding element, the holding element including a top part having an entrainment profile in a rear area of the holding element for the rotatably fixed coupling of the top part with a setting tool, the holding element includes a receiving part having a receptacle, open toward the front, in a front area of the holding element, in which the nut is rotatably fixedly accommodated, and the holding element includes means for torque transmission from the top part to the receiving part, which connect the top part and the receiving part, the means for torque transmission breaking at a limiting torque, thereby interrupting the connection between the top part and the receiving part. The present invention also relates to a fastening arrangement made up of an expansion anchor and a device of this type for torque limiting and a method for manufacturing a device of this type.

A generic device for torque limiting is known from DE 102010043167 A1, which may be used in connection with expansion anchors and which has a predetermined breaking point, which breaks upon reaching a limiting torque. According to DE 102010043167 A1, the device includes means for the rotationally decoupled force transmission from the top part to the nut, so that the predetermined breaking point is preserved during hammering.

Another device for torque limiting is described in the international patent application having the PCT file number PCT/EP2016/072232 (now published as WO 2017050725 A1). This device includes at least one clamping element made from a plastic material for clamping the nut or the bolt head.

Other devices for torque limiting, which may be mounted on nuts or bolt heads, are known from FR 2598855 A1 and U.S. Pat. No. 4,215,600 A. According to U.S. Pat. No. 4,215,600 A, clamping projections formed as a single piece with the receiving part may be provided for the nut in the interior of the receiving part, which act laterally against the nut.

A screw having a multi-part head is derived from DE 102011106696 A1 which includes an outer sleeve, which is rotatable around an inner part of the head.

EP1353080 B1 shows a torque limiting element for expansion anchors.

SUMMARY OF THE INVENTION

It is an object of the present invention to provide a device for torque limiting, which ensures a particularly high reliability and, in particular, good handling capability with little complexity, in particular manufacturing complexity, in particular with respect to using the device in connection with expansion anchors, as well as to provide a corresponding fastening arrangement and a corresponding manufacturing method.

The present invention provides a device for torque limiting, a fastening arrangement and a method for manufacturing a device of this type.

A device according to the present invention for torque limiting is characterized in that the holding element includes at least one holding claw, which is situated on the receiving part, and which secures the nut in the receptacle on the front side of the nut.

The present invention is based on the finding that, when using devices for torque limiting in combination with expansion anchors, special load situations may occur, which under certain circumstances may result in reliability limitations in known devices. Expansion anchors are thus often mounted in so-called through-hole technology. In this type of assembly, the nut is already screwed onto the expansion anchor at the beginning of the assembly operation, and the expansion anchor, together with the screwed-on nut, is driven through an attachment part into a borehole with the aid of hammer blows applied to the back of the expansion anchor. Due to the non-negligible mass of the holding element of the device for torque limiting, inertial forces occur between the nut axially connected to the hammered-in anchor, on the one hand, and the holding element surrounding the nut, on the other hand, during the hammer blows. These inertial forces drive the nut forward out of the holding element and in extreme cases may result in the fact that the holding element of the device for torque limiting falls off the nut, so that no reliable limiting of the torque and no checking of the reaching of a setpoint torque is possible anymore. It has been demonstrated that this may occur under some circumstances despite existing clamping elements, since a normal clamping action is unable to withstand the forces occurring during hammer blows.

This is where the present invention comes in and provides one or multiple holding claws on the holding element, which secure the nut against the nut emerging on the front side from the receptacle of the receiving part, which is open toward the front. The at least one holding claw forms an obstacle against which the nut strikes on the front side and which holds the nut back in the receptacle. The nut is thus secured by the at least one holding claw on the front side of the nut in a form-fitting manner, i.e. through engagement. Compared to known clamping projections, which operate primarily based on friction and on the side of the nut, a particularly reliable securing is thus provided, which is also able to particularly reliably withstand the comparatively high forces which occur in connection with expansion anchors during hammer blows. A device for torque limiting is therefore particularly easily provided, which may also be reliably used in combination with expansion anchors and facilitates a particularly reliable checking of the reaching of a setpoint torque in this case as well. In contrast to clamping projections which act against the side walls of the nut and which form difficult to manufacture undercuts in a casting process, the holding claws acting against the front end face of the nut according to the present invention are also particularly easy to manufacture, preferably through non-metal-cutting forming of the blank from which the device for torque limiting is manufactured in particular by pressing the blank into a die. It may be provided, for example, to radially act upon the blank after the nut is placed into the receptacle by pressing it into a die on the receiving part in such a way that material of the blank flows radially inwardly and forms the holding claw. Finally, the connection obtained according to the present invention is particularly secure even in the case of premature stresses during transport, temperature fluctuations and/or under long-term effects.

In particular, the at least one holding claw may protrude radially inwardly from the receiving part and/or be situated axially in front of the receptacle for the nut, which is open toward the front. The at least one holding claw is preferably situated on the front side of the receiving part on the receiving part, which is advantageous from a manufacturing perspective. The at least one holding claw forms a front-side stop for the nut. The receptacle is, in particular, open toward the front to ensure an introduction of the nut from the front during manufacturing. In the finished device, however, the nut is no longer able to emerge from the receptacle toward the front, due to the at least one holding claw.

The direction indications of front, back, front-side, rear, etc. are to be used uniformly here. For example, the front side of the nut is thus situated in front of the back side of the nut in the same direction as the receiving part situated in the front area of the holding element is positioned with respect to the top part situated in the rear area of the holding element. In particular, the front side of the nut, on which the holding claws act against the nut, may be understood to be the side of the nut which is facing away from the top part.

To the extent that an axial direction and a radial direction are mentioned, they are to relate, in particular, to the same axis, which may be, in particular, a longitudinal axis and/or an axis of symmetry of the device, the top part, the receiving part, the entrainment profile, the receptacle and/or the expansion anchor, the axes of these elements preferably coinciding.

The nut may be, for example, a DIN nut. It has a through-opening with a female thread, which may be screwed, in particular, onto a threaded rod. The threaded rod may preferably be the shaft of an expansion anchor.

The entrainment profile is used for rotatably fixedly coupling the output side of the setting tool to the top part and, in particular, for applying a torque from the setting tool to the top part, in particular a torque directed in the axial direction. The entrainment profile may be, for example, an outer polygonal profile, in particular an outer hexagonal profile, which is situated on the circumferential side of the top part. The setting tool may be, for example, a wrench or a handheld power tool. The top part may preferably have a passage for a threaded rod, the passage opening into the receptacle for the nut, and the passage being open toward the rear. Accordingly, the threaded rod may pass through the device.

The receptacle may be, in particular, a recess formed in the holding element, into which the nut is placed. The receptacle is preferably delimited by the receiving part on the circumferential side and/or delimited by the top part on the rear side. The receiving part preferably forms a sleeve, which surrounds the receptacle and which thus also surrounds the nut, at least in areas. The nut is rotatably fixedly situated in the receptacle, in particular rotatably fixedly situated with the receiving part in the receptacle, i.e. a connection exists between the receiving part and the nut situated in the receptacle, preferably a form-fitting connection, which facilitates a transmission of a torque, in particular an axially directed torque, between the receiving part and the nut. The receptacle may preferably include another entrainment profile, for example an inner polygonal profile, in particular an inner hexagonal profile, for the rotatably fixed connection between the receiving part and the nut, which corresponds with an outer profile of the nut.

In particular, the device according to the present invention is designed in such a way that the means for torque transmission break preferentially at the limiting torque, interrupting the connection between the top part and the receiving part. Preferential breaking may be understood to mean, in particular, that the means for torque transmission break at a lower torque than the top part and the receiving part, so that the means for torque transmission form a predetermined breaking point.

The nut may be countersunk in the receiving part. However, the nut preferably protrudes at least a short distance forward beyond the receiving part. It is particularly preferred that the nut projects forward over the at least one holding claw. This makes it possible to particularly easily prevent the at least one holding claw from touching a part situated upstream from the device for torque limiting, for example an upstream washer. A particularly well defined friction behavior, in turn, may be obtained hereby which may be important, in particular with regard to the ratio between tightening moment and pretension. For the same reason, it may be advantageous, in particular, that the nut protrudes forward beyond the entire holding element.

It is particularly preferred that the holding claws and the receiving part have a monolithic design, a monolithic design being able to be understood, in particular, as a design having no joints. This may be advantageous with regard to the manufacturing complexity and reliability. For example, the at least one holding claw may be manufactured by easily deforming the receiving part.

It may advantageously be provided that the at least one holding claw and the receiving part are made from a metal casting material, in particular a metal die casting material. This may be advantageous, among other things, with regard to the manufacturing complexity. The means for torque transmission and/or the top part are also preferably metallic and preferably include a metal casting material, at least in areas. The receiving part, the means for torque transmission and at least part of the top part preferably have a monolithic design, which may further reduce the manufacturing complexity. The top part may also have a multi-part design and include a separate sleeve made from a ductile material, on which the entrainment profile is formed.

A single holding claw may generally be provided. This holding claw could also have a closed annular design for particularly good force transmission and completely surround the receptacle on the front side of the receptacle. It is particularly preferred that the holding element includes multiple, in particular separate, holding claws, which are situated on the receiving part, and which secure the nut in the receptacle on the front side of the nut. This may be advantageous for a particularly good force transmission. In addition, it may be advantageous with regard to the breaking precision of the device, namely in particular if the holding claws are manufactured by deforming the receiving part. In contrast to a design having a single, closed annular holding claw, separate holding claws may be situated in the circumferential direction, offset from the means for torque transmission, which may be designed as webs, and it may be particularly easily avoided that the means for torque transmission are prematurely stressed, namely during the manufacture of the holding claws, which could impair the breaking precision.

If multiple holding claws are provided, the features described here in connection with one holding claw preferably apply to all holding claws as well as to only part of the holding claws or only to one holding claw.

For example, three or six holding claws may be provided. It is particularly preferred that the receptacle has an inner polygonal profile, the number of holding claws preferably corresponding to the number of edges of the inner polygonal profile. In particular, it may be provided that at least part of the holding claws is situated in front of one edge of the inner polygonal profile in each case, in particular in a position overlapping the particular edge in the circumferential direction. Accordingly, the holding claws may act against the nut in the edge area of the nut, which may be particularly force-symmetrically and geometrically advantageous.

It is furthermore advantageous that the means for torque transmission are designed as at least one web, which connects the top part and the receiving part. This represents a particularly structurally simple and simultaneously reliable design. The means for torque transmission are preferably designed as webs, which connect the top part and the receiving part. The webs may form a predetermined breaking point, which breaks upon reaching the limiting torque. The webs may be arranged, in particular, around the longitudinal axis of the device. The webs preferably extend in the radial direction, at least in areas, which may be advantageous for the flux of force. With regard to the force symmetry, it may be advantageous that the webs are arranged equidistantly in the circumferential direction. The top part preferably has a smaller outer diameter than the receiving part, which may be advantageous, for example, with regard to the amount of material used.

It is particularly preferred that the receiving part has at least one wall thickness taper, which is situated in front of the at least one web, in particularly axially and/or in a position overlapping the web in the circumferential direction. In particular, the wall thickness taper may reach up to the front end face of the receiving part. This may contribute to relieving stress on the web of the means for torque transmission during the manufacture of the holding claws. If the holding claws are namely manufactured by front-side compression of the receiving part in a die, the wall thickness taper may cause the die to engage less firmly or not at all in this area, so that the web situated axially above is therefore subjected to comparatively less stress. If multiple webs are provided, a wall thickness taper is situated in front of each of the webs. For the purpose of relieving stress on the web, it may also be advantageous that the receiving part is recessed in an area situated axially in front of the web on the outside with respect to a circumference around the receiving part.

The top part suitably includes an axial stop, which forms a rear stop for the nut. This axial stop may be formed, for example, by projections or a ring, which protrudes on the top part. The axial stop may be situated, in particular, at a distance from the means for torque transmission, to avoid an axial stressing of these means, which, in the least favorable case, could result in the premature breakage of the means.

It is also advantageous that the nut is held axially without clearance by the at least one holding claw, and the nut is preferably accommodated without clearance between the axial stop and the at least one holding claw. This may be understood to mean that the nut abuts the axial stop and the at least one holding claw simultaneously, the former on the back side of the nut, the latter on the front side of the nut.

The clearance-free arrangement may avoid an undesirable relative movement of the nut in the holding element with corresponding acceleration forces and loads.

It is particularly preferred that the receiving part has at least one recess for a tool, in particular for a screwdriver blade, preferably on the end face. The receiving part may be lifted off the nut, overcoming the at least one holding claw, by introducing a tool into the recess and, for example, turning the screwdriver blade in the recess.

The invention also relates to a fastening arrangement made up of an expansion anchor and a device according to the present invention for torque limiting, the nut of the device being screwed onto the expansion anchor. An expansion anchor may be understood according to usual practice to be an anchor which includes an expansion element, in particular an expansion sleeve, which is offset radially to the outside for anchoring on the anchor.

The present invention also relates to a method for manufacturing a device according to the present invention for torque limiting, in which the at least one holding claw is manufactured by pressing the receiving part, in particular the front-side end of the receiving part, into a die. As already explained above, it may be provided, in particular, to radially act upon the blank after the nut is placed into the receptacle by pressing it into a die on the receiving part in such a way that material of the receptacle flows radially inwardly and forms the holding claw. The die may be, in particular, a die which tapers on the inside, at least in areas, preferably a die having a conical inner shape.

Features which are explained in connection with the devices according to the present invention for torque limiting may also be used in the fastening arrangements according to the present invention and in the manufacturing methods according to the present invention, and conversely features which are explained in connection with the fastening arrangements according to the present invention or the manufacturing methods according to the present invention may also be used in the devices according to the present invention for torque limiting.

BRIEF DESCRIPTION OF THE DRAWINGS

The present invention is explained in greater detail below on the basis of preferred exemplary embodiments, which are represented schematically in the attached figures, it being possible, in principle, to implement individual features of the exemplary embodiments illustrated below individually or in an arbitrary combination within the scope of the present invention.

DETAILED DESCRIPTION

The views in FIGS. 8 through 14, which show the second specific embodiment, each have essentially the same perspectives as the views in FIGS. 1 through 7, which show the first specific embodiment.

Figure 1:
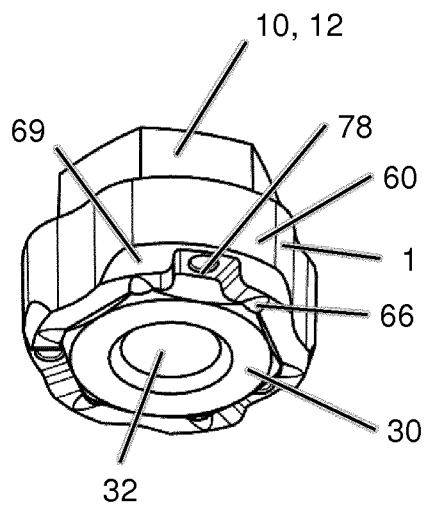
FIG. 1 schematically shows a perspective representation of a first specific embodiment of a device according to the present invention for torque limiting, with a view of the front side of the device.
Figure 2:
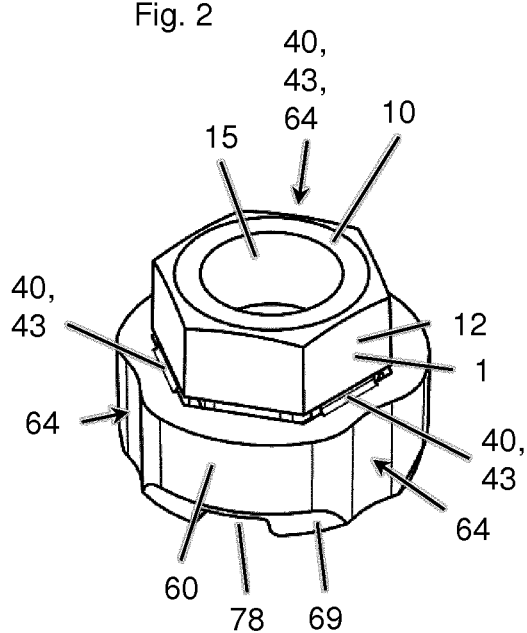
FIG. 2 schematically shows a perspective representation of the device from FIG. 1, with a view of the back side of the device.
Figure 3:
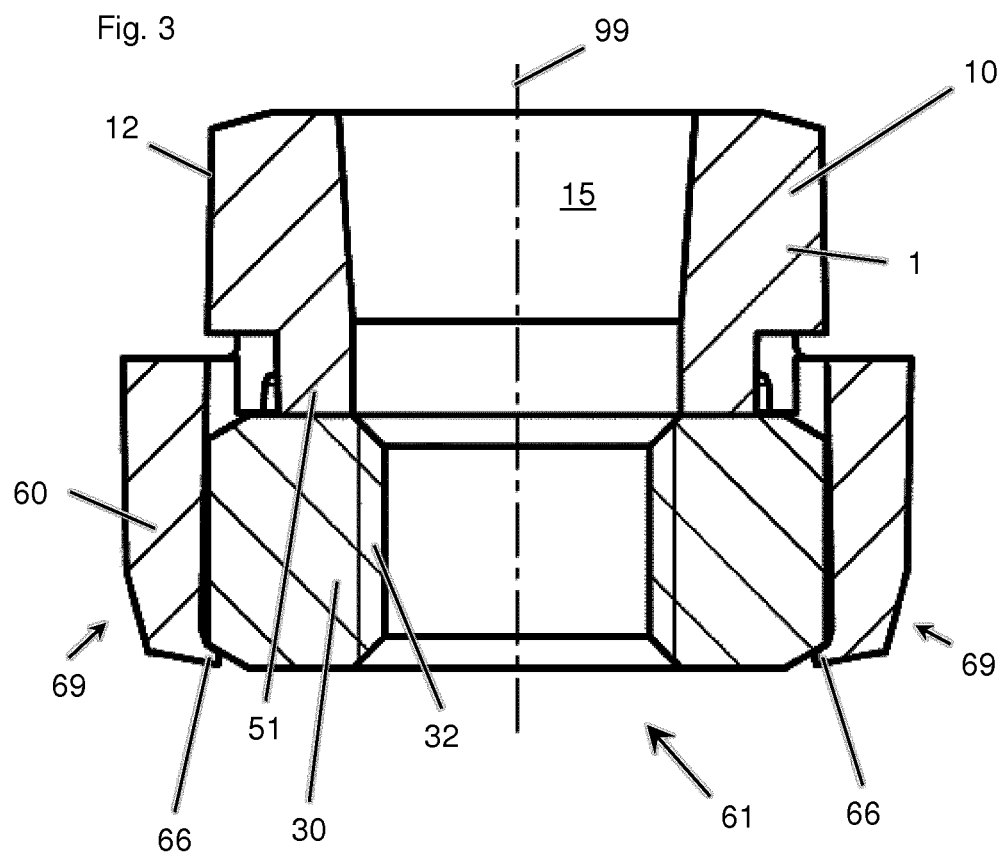
FIG. 3 schematically shows a longitudinal sectional view of the device for torque limiting from FIGS. 1 and 2.

FIGS. 1 through 3 show a first exemplary embodiment of a device according to the present invention for torque limiting. As shown in these figures, the device includes a nut 30 having a female thread 32, on the one hand, and a crown-shaped holding element 1, on the other hand, in which nut 30 is held. Holding element 1, in turn, includes a top part 10 in its rear area, a receiving part 60 in its front area, situated toward the front of top part 10, and examples of three webs 43. Webs 43 connect top part 10 and receiving part 60 and form means 40 for torque transmission from top part 10 to receiving part 60. Webs 43 extend from top part 10 radially outwardly toward receiving part 60 which has a larger outer diameter than top part 10. Webs 43 are apparent, in particular in FIG. 2, rear covered web 43 being formed in a similar manner as the two front, visible webs 43.

A receptacle 61, in which nut 30 is accommodated, is formed in receiving part 60. Receiving part 60 has an inner hexagonal profile on receptacle 61 for the form-fitting torque transmission from receiving part 60 to nut 30, which is apparent, in particular in FIG. 6, and which corresponds to an outer hexagonal profile of nut 30. Another polygonal profile may also be provided instead of a hexagon. Additionally or alternatively, a frictionally engaged, rotatably fixed connection may also be present.

Top part 10 has an entrainment profile 12, designed for example as an outer hexagonal profile, with the aid of which a torque is transmittable from a setting tool, which is not illustrated, to top part 10 in a form-fitting manner. Receiving part 60 and top part 10 are arranged coaxially and define a shared longitudinal axis 99 of the device. Top part 10 has a passage 15, which is flush with receptacle 61 of receiving part 60, so that a threaded rod screwed into nut 30 may emerge from receiving part 60 on the back side of receiving part 60. Longitudinal axis 99 runs through receptacle 61 and passage 15.

Figure 5:
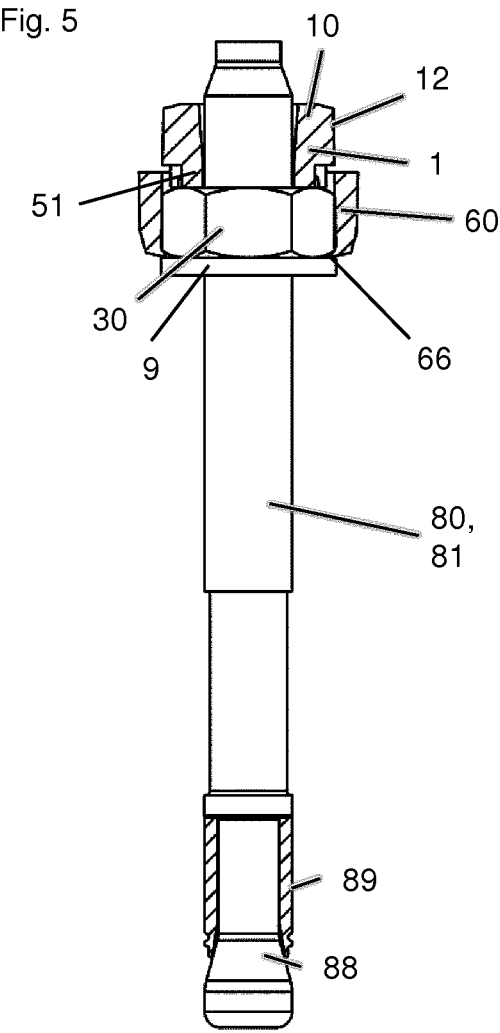
FIG. 5 schematically shows the fastening arrangement according to FIG. 4 in a partially cut, longitudinal sectional view.

As is apparent, in particular in FIG. 3 and FIG. 5, top part 10 includes an axial stop 51, which forms a rear stop for nut 30. Axial stop 51 limits an axial movement of nut 30 accommodated in receptacle 61 relative to top part 10 and toward the back. Axial stop 51 furthermore permits a direct transmission of axial forces from top part 10 to nut 30 without stressing webs 43. The example of axial stop 51 in this case is formed by an annular, preferably closed, projection, which protrudes from top part 10. As a further example, axial stop 51 in this case, is shown to be radially farther to the inside than webs 43 and/or axially in front of webs 43.

Holding element 1 also includes holding claws 66, which are situated on receiving part 60 on the front side of receiving part 60, i.e. on the side of receiving part 60 facing away from top part 10. These holding claws 66 form a front stop for nut 30 and limit a forward axial movement of nut 30 accommodated in receptacle 61 relative to top part 10. In the illustrated exemplary embodiment, examples of a total of six holding claws 66 are provided, one each per edge of the inner hexagonal profile of receptacle 61. As illustrated, in particular in FIG. 1, one holding claw 66 is situated in front of each edge of the inner hexagonal profile in an overlapping position in the circumferential direction, so that holding claws 66 each act upon one edge of nut 30.

Nut 30 is preferably held axially without clearance between axial stop 51, on the one hand, and holding claws 66, on the other hand, i.e. nut 30 simultaneously abuts axial stop 51 on the back and at least one of holding claws 66 on the front.

Holding claws 66 are monolithically formed together with receiving part 60. Receiving part 60, top part 10, webs 43 and/or holding claws 66 include a metallic material.

Figure 4:
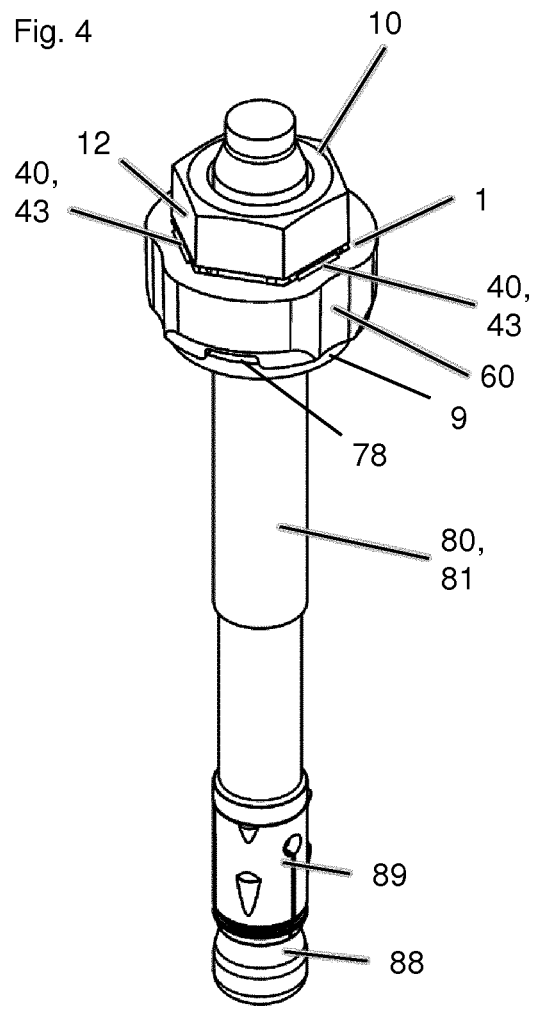
FIG. 4 schematically shows a fastening arrangement made up of a device for torque limiting according to FIGS. 1 through 3 and an expansion anchor in a perspective view, with a view of the back side of the device for torque limiting.

FIGS. 4 and 5 show a fastening arrangement made up of the device described above for torque limiting and an expansion anchor 80. In mechanical anchors of this type, an installation with a defined pretension by tightening with a defined limiting torque may be relevant, for example to avoid spalling areas in the substrate when mounted near the edge. Expansion anchor 80 includes a shaft 81 as well as an expansion element 89, which in this case is designed by way of example as an expansion sleeve surrounding shaft 81. A preferably conical bevel 88, which tapers toward the back, is situated on shaft 81, in particular in a front area. A wedge gear is formed between bevel 88 of shaft 81 and expansion element 89, which is able to convert an axial relative movement of shaft 81 to expansion element 89 into a radial movement of expansion element 89 and thereby anchor expansion element 89 on the wall of a borehole under the tensile load in shaft 81.

In the fastening arrangement in FIGS. 4 and 5, nut 30 of the device for torque limiting is screwed onto shaft 81 of expansion anchor 80, shaft 81 of expansion anchor 80 passing through the device for torque limiting, i.e. entering the device on the front side and emerging from the device on the back side, and bevel 88 of expansion anchor 80 and expansion element 89 of expansion anchor 80 being situated in front of the device for torque limiting.

During mounting, expansion anchor 80 of the fastening arrangement is hammered into a borehole with the aid of hammer blows onto the back side of shaft 81. Holding claws 66 ensure that nut 30 screwed onto shaft 81 remains in holding element 1 despite the inertia of holding element 1.

A torque is thus applied to top part 10 via entrainment profile 12 with the aid of a setting tool. This torque is transmitted to receiving part 60 via webs 43 and from receiving part 60 on to nut 30. This, in turn, induces a tensile force in shaft 81 of expansion anchor 80, which, in turn, radially stresses expansion element 89 and thereby anchors expansion anchor 80.

If the torque applied to top part 10 reaches a predetermined limiting torque, webs 43 shear off, resulting in the fact that top part 10 separates from receiving part 60 and torque is no longer transmitted to receiving part 60 and nut 30. The device for torque limiting therefore acts as a torque-limiting shear nut. After webs 43 shear off, top part 10 is separated from receiving part 60 and falls off receiving part 60.

As is apparent, in particular in FIG. 3, nut 30 situated in receptacle 61 protrudes forward a short distance beyond holding claws 66. When the device rotates, nut 30 thus rubs primarily against the adjacent part, the adjacent part being able to be the washer 9 illustrated in FIGS. 4 and 5, and the rubbing being characterized primarily by the surface condition of nut 30.

The device for torque limiting has recesses 78 on the front end face of its receiving part 60. For example, a screwdriver or another tool may be inserted thereinto for the purpose of lifting receiving part 60 off of nut 30 by overcoming holding claws 66, should this be necessary, in particular, after top part 10 shears off of receiving part 60.

Figure 6:
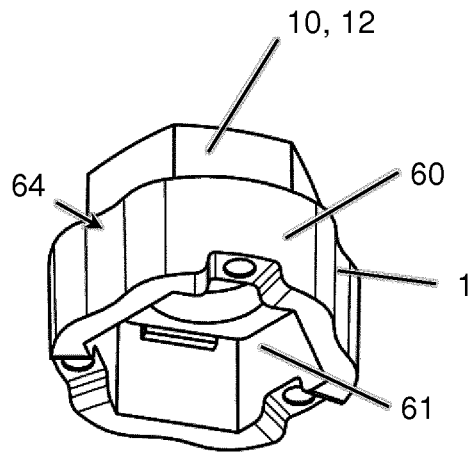
FIGS. 6 and 7 schematically show consecutive process stages during the manufacture of a device for torque limiting corresponding to FIGS. 1 through 3.
Figure 7:
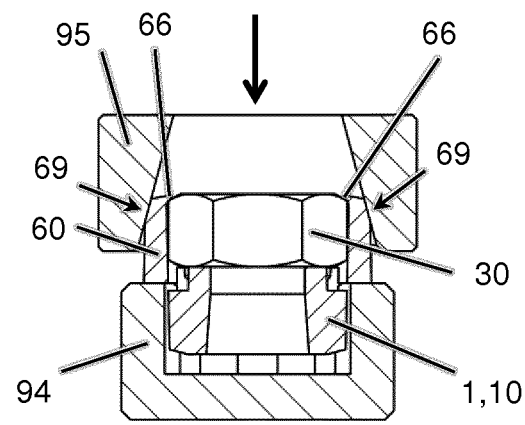

The manufacture of the device for torque limiting according to the first specific embodiment is illustrated schematically in FIGS. 6 and 7. As shown in FIG. 6, the inner walls of receptacle 61 in receiving part 60 are still smooth at the beginning of the manufacturing process, and holding claws 66 are still missing, which permits nut 30 to enter receptacle 61 from the front side of receiving part 60. In a subsequent manufacturing step, which is illustrated in FIG. 7, nut 30 is inserted axially into receptacle 61, and the device for torque limiting is thus situated between a top die 94 and a bottom die 95, which has a die opening for receiving part 60, in such a way that top part 10 faces top die 94 and receiving part 60 faces bottom die 95. The bottom die opening for receiving part 60 tapers, preferably conically, as the depth increases. As indicated by an arrow, top die 94 and bottom die 95 then approach each other. Receiving part 60 is pressed thereby into the bottom die opening at its front end. The tapering of the bottom die opening induces a material flow, orientated radially inwardly, on the front end of receiving part 60, in which holding claws 66 are formed, and nut 30 is secured in receptacle 61 and caulked to holding element 1. As a result of the inward radial material flow, flattened areas 69 may form on the outside of receiving part 60. As shown in FIG. 7, it is particularly preferred that top die 94 and bottom die 95 act exclusively against receiving part 60 and not against top part 10, so that webs 43 between top part 10 and receiving part 60 are not already stressed during manufacturing.

As illustrated, in particular in FIGS. 2 and 6, receiving part 60 has wall thickness tapers 64, three in number in the present exemplary embodiment, even before it is introduced into bottom die 95. A wall thickness taper 64 is situated axially in front of each web 43, i.e. particular web 43 and particular wall thickness taper 64 are in an overlapping position in the circumferential direction. Wall thickness tapers 64 extend up to the front end face of receptacle 60. Due to wall thickness tapers 64, bottom die 95 acts against receiving part 60, offset with respect to webs 43 in the circumferential direction, and webs 43 are thus preserved during the manufacture of holding claws 66. As a result of this design, flattened areas 69 may be situated offset with respect to webs 43 in the circumferential direction in the finished device.

Figure 8:
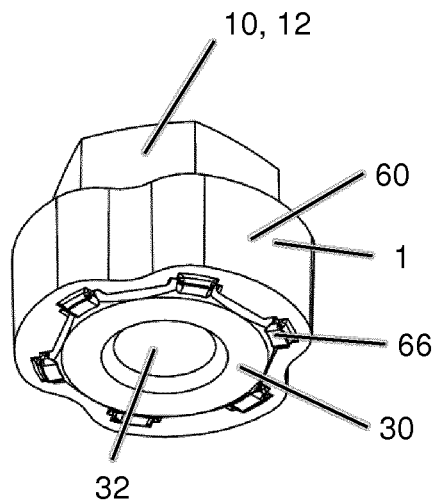
FIG. 8 schematically shows a perspective representation of a second specific embodiment of a device according to the present invention for torque limiting, with a view of the front side of the device.
Figure 9:
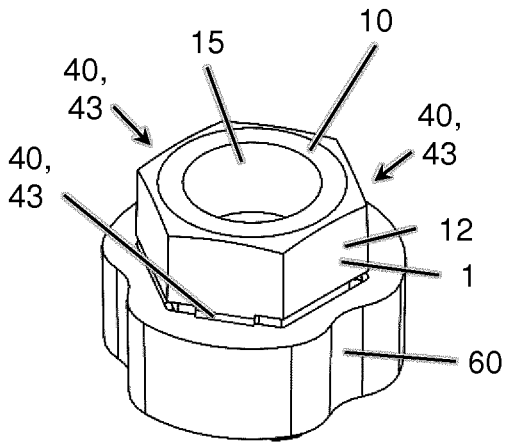
FIG. 9 schematically shows a perspective representation of the device from FIG. 8, with a view of the back side of the device.
Figure 10:
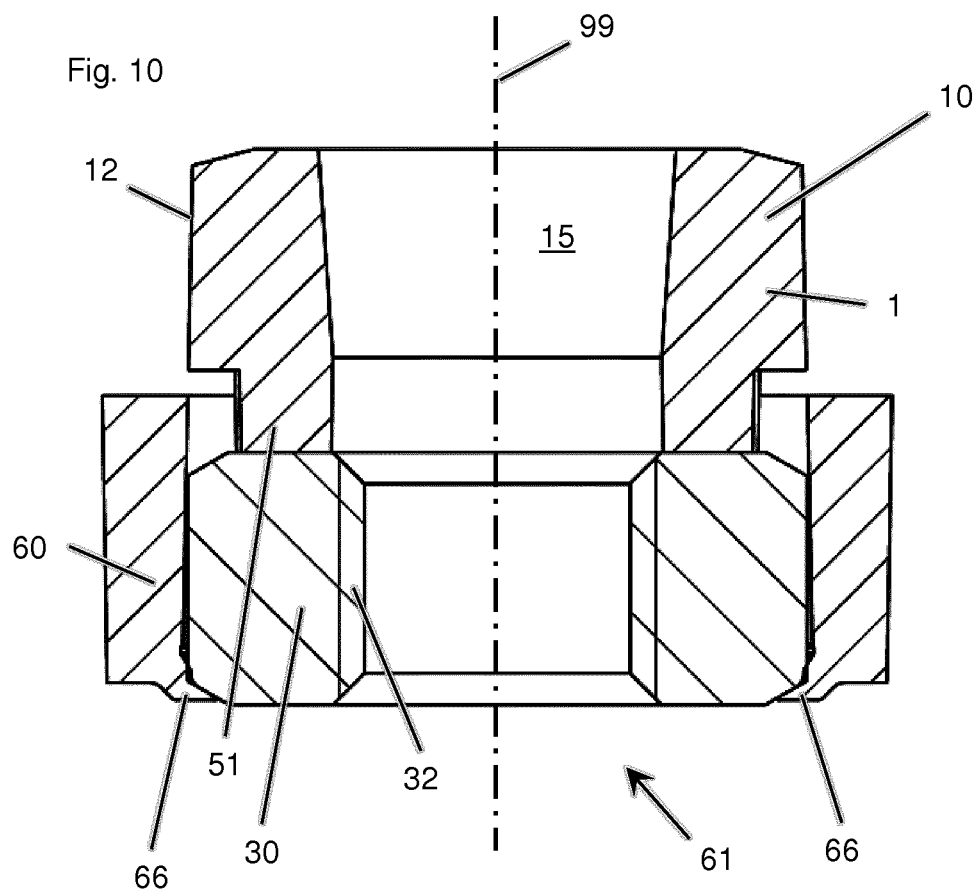
FIG. 10 schematically shows a longitudinal sectional view of the device for torque limiting from FIGS. 8 and 9.
Figure 11:
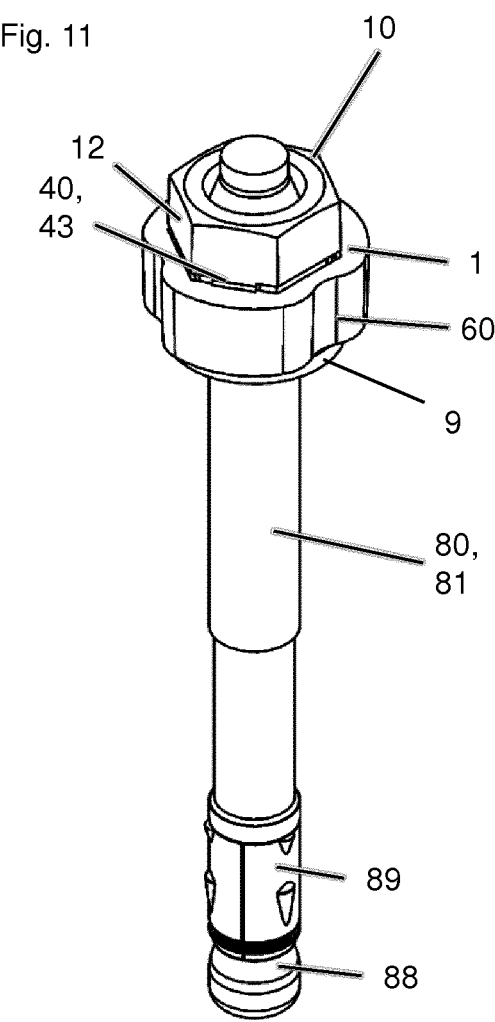
FIG. 11 schematically shows a fastening arrangement made up of a device for torque limiting according to FIGS. 8 through 10 and an expansion anchor in a perspective view, with a view of the back side of the device for torque limiting.
Figure 12:
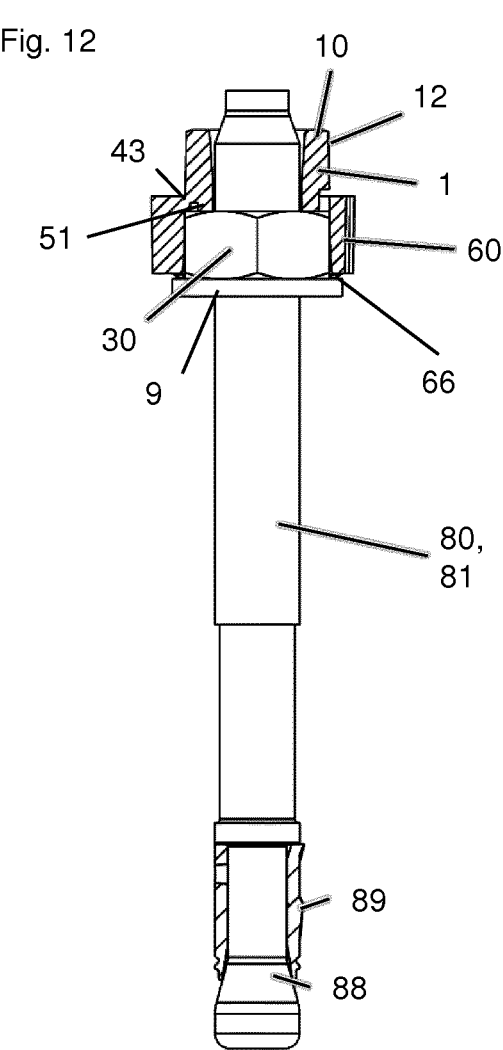
FIG. 12 schematically shows the fastening arrangement according to FIG. 11 in a partially cut, longitudinal sectional view.
Figure 13:
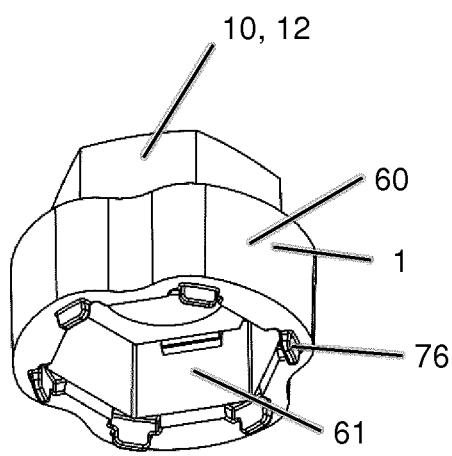
FIGS. 13 and 14 schematically show consecutive process stages during the manufacture of a device for torque limiting corresponding to FIGS. 8 through 10.
Figure 14:
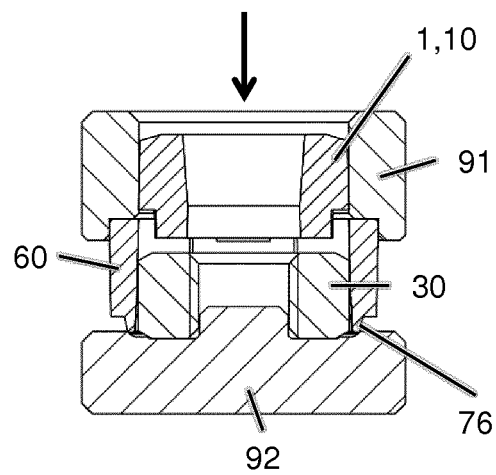

FIGS. 8 through 10 show a second specific embodiment of a device according to the present invention for torque limiting, FIGS. 11 and 12 show a fastening arrangement formed herewith, and FIGS. 13 and 14 show an associated manufacturing method. The embodiments in FIGS. 8 through 14 similarly implement a number of features of the embodiments in FIGS. 1 through 7, so that the above description may be similarly applied and only the essential differences are discussed below, the elements having the same functions in the second exemplary embodiment being designated in the figures by the same reference numerals as for the first exemplary embodiment.

Differences between the two specific embodiments exist, in particular, in the shape of holding claws 66 and their manufacturing method. As illustrated, in particular in FIGS. 13 and 14, holding claws 66 in the second specific embodiment, in contrast to the first specific embodiment, are not manufactured by radially compressing the wall of receptacle 61, but instead holding claws 66 are manufactured by bending down tabs 76, which protrude axially on the end face of receiving part 60 at the beginning of the manufacturing operation. As shown in FIG. 13, tabs 76 are still straight at the beginning of the manufacturing process, i.e. they are not yet bent down, and permit an entry of nut 30 into receptacle 61. In a subsequent manufacturing step, which is illustrated in FIG. 14, nut 30 is inserted axially into receptacle 61, and the device for torque limiting is then situated between two dies 91 and 92, which are pressed together, as indicated by an arrow. Tabs 76 are bent toward holding claws 66 hereby, and nut 30 is secured in receptacle 61 and caulked to holding element 1. Dies 91 and 92 may be provided on a simple tool, for example a handheld press, or also on an automated press. As shown in FIG. 14, it is particularly preferred that the two dies 91 and 92 act exclusively against receiving part 60 and not against top part 10, so that webs 43 between top part 10 and receiving part 60 are not already stressed during manufacturing.

What is claimed is:

1. A device for torque limiting, the device comprising:
 a nut; and
 a holding element, the holding element including a top part having an entrainment profile in a rear area of the holding element for the rotatably fixed coupling of the top part with a setting tool,
 the holding element including a receiving part having a receptacle, open toward a front, in a front area of the holding element, the nut being rotatably fixedly accommodated in the receiving part,
 the holding element including a torque transmitter from the top part to the receiving part and connecting the top part and the receiving part, the torque transmitter breaking at a limiting torque, interrupting the connection between the top part and the receiving part, the holding element including at least one holding claw situated on the receiving part and securing the nut in the receptacle on the front side of the nut.

2. The device as recited in claim 1 wherein the nut protrudes forward beyond the at least one holding claw.

3. The device as recited in claim 1 wherein at least one holding claw and the receiving part have a monolithic design.

4. The device as recited in claim 1 wherein the at least one holding claw includes a plurality of holding claws.

5. The device as recited in claim 1 wherein the torque transmitter is designed as at least one web connecting the top part and the receiving part.

6. The device as recited in claim 5 wherein the receiving part has at least one wall thickness taper situated in front of the at least one web.

7. The device as recited in claim 1 wherein the top part includes an axial stop forming a rear stop for the nut.

8. The device as recited in claim 7 wherein the nut is accommodated without clearance between the axial stop and the at least one holding claw.

9. The device as recited in claim 1 wherein the receiving part has at least one recess for a tool on the end face.

10. The device as recited in claim 9 wherein the at least one recess is a screwdriver blade receiving recess.

11. A fastening arrangement comprising: an expansion anchor and the device as recited in claim 1, the nut being screwed onto the expansion anchor.

12. A method for manufacturing the device as recited in claim 1, the method comprising manufacturing the at least one holding claw by pressing a front-side end of the receiving part into a bottom die.

* * * * *